UNITED STATES PATENT OFFICE.

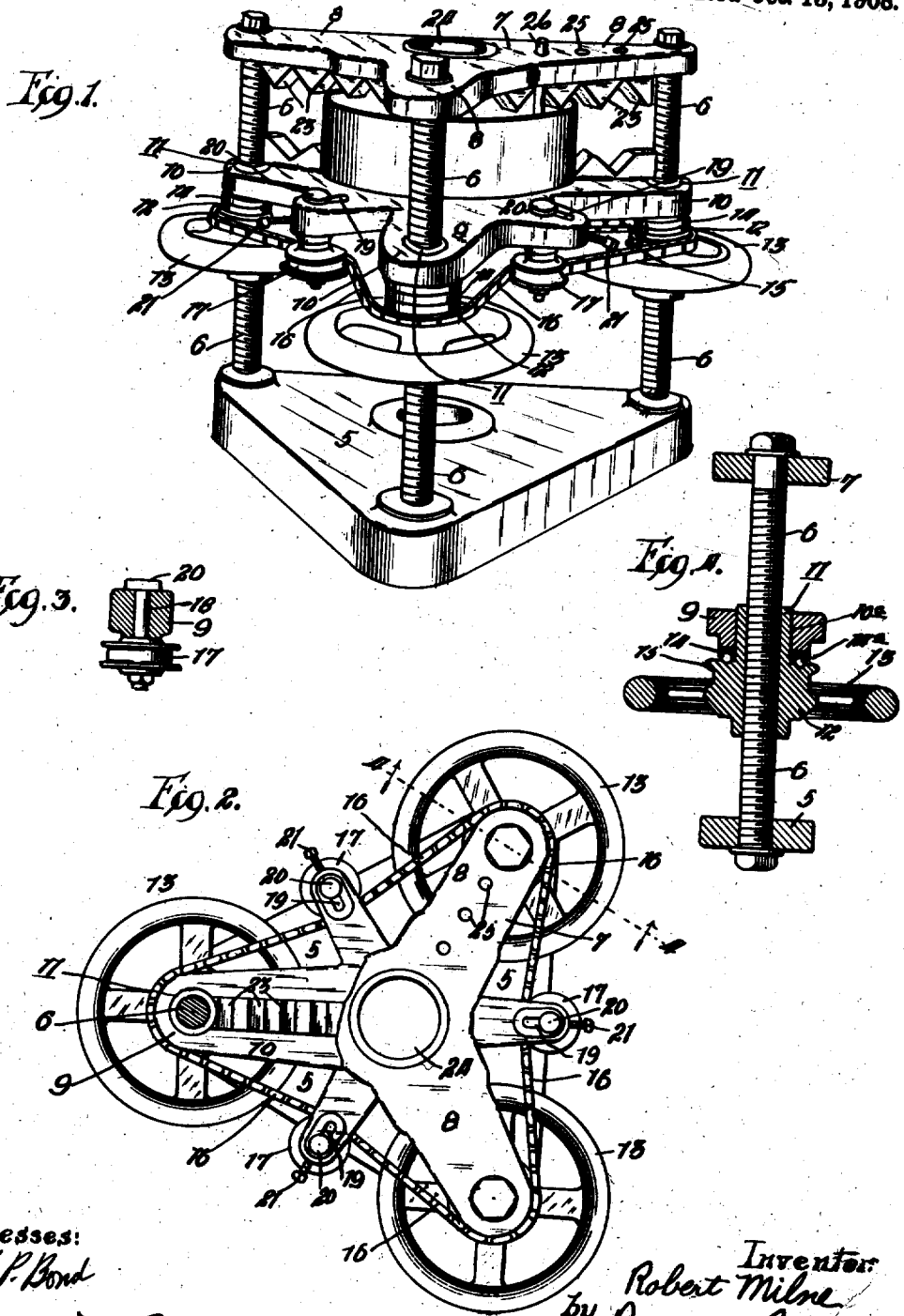

ROBERT MILNE, OF ROCKFORD, ILLINOIS, ASSIGNOR TO B. F. BARNES COMPANY, A CORPORATION OF ILLINOIS.

CENTERING-CHUCK.

No. 901,249.   Specification of Letters Patent.   Patented Oct. 13, 1908.

Application filed November 21, 1907. Serial No. 403,219.

*To all whom it may concern:*

Be it known that I, ROBERT MILNE, a citizen of the United States, residing at Rockford, in the county of Winnebago and State of Illinois, have invented certain new and useful Improvements in Centering-Chucks, of which the following is a specification.

The chuck of the present invention is intended more especially for use in centering a pulley wheel under the spindle of a drill; and the object of the invention is to provide means for exactly positioning the pulley wheel and thereafter clamping it during the drilling or machining operation.

Another object of the invention is to so clamp the pulley wheel or other object that it will be held against vibration or displacement, and against the tendency to torsional movement due to the revolution of the drill.

A further object of the invention is to so construct the clamping jaws that uniform pressure will be applied at all points on the circumference of the wheel, whereby a minimum amount of pressure will serve to hold the wheel or other object in clamped position.

The invention consists in the features of construction and combination of parts hereinafter described and claimed.

In the drawings, Figure 1 is a perspective view of the entire chuck; Fig. 2 a top or plan view of the same; Fig. 3 a detail of one of the idler pulley wheels; and Fig. 4 a cross sectional view taken on line 4—4 of Fig. 2.

The chuck as a whole is mounted upon a triangular bed plate 5, which is adapted to be positioned and held on the platen of a drill press or similar machine, and the triangular bed plate has mounted thereon three screw-threaded posts or uprights 6, which are positioned at the three corners of the bed plate. The screw posts are rigidly entered into the bed plate and, at their upper ends, are entered through and rigidly secured to a fixed jaw head 7 having three radially arranged arms 8, the outer ends of which register with the three corners of the triangular bed plate. The fixed jaw head coöperates with the movable jaw head 9, comprising three arms 10 of shape and dimensions similar to the radial arms on the fixed jaw head, through which arms 9 the screw posts or uprights are passed. Each of the arms 9 is provided with a smooth vertical bore 10ª through which is entered a sleeve 11, which upwardly extends from and forms part of a hub 12 integrally formed with an adjusting hand wheel 13. Intermediate the hub and the lower face of the arm is interposed a washer 14 having in its lower face a runway in which are entered balls 14ª which provide a suitable bearing for the revolution of the hand wheel. The hub and sleeve are screw threaded on their interior to receive the screw threads of the fixed posts or uprights, and the movable jaw head as a whole is adjustable by the hand wheels.

Each of the hand wheels has, on its hub, sprocket teeth 15, which are intended to engage with an endless chain 16, which runs around the three hand wheels and is adapted to have its slack adjusted by means of three idler pulley wheels 17 journaled upon stub shafts 18. The three stub shafts are adjustably mounted within slots 19 in lugs 20, which outwardly extend from the movable jaw head intermediate the arms thereof. The stub shafts are adapted to be held in adjusted position by means of set screws 21 inwardly extending through the ends of the lugs 20.

Each of the three arms of the fixed movable jaw heads is provided, on its inner surface, with teeth 23, which are of wedge shape formation having faces cut at an angle of about 45° and lying in planes that converge toward the center of the chuck. The upper and lower teeth are in exact register with one another, the ridges of the upper teeth being exactly above and in line with the ridges of the lower teeth, and the sides sloping away from one another at the same angle.

The fixed or upper jaw head is provided, in its exact center, with an opening 24, through which the drill is adapted to enter; and one of the arms is provided with a plurality of radially arranged holes 25, through any one of which a pin 26 can be dropped to hold the pulley wheel or other object against torsional movement.

In use, when it is desired to center a pulley wheel for the purpose of drilling out a hub or center, the wheel, regardless of its size, is laid upon the lower or movable jaw head, the rim of the wheel resting upon the sloping sides of three of the lower jaw teeth. In positioning the wheel it is not necessary to center it, for the reason that the centering will be performed automatically when the jaws are adjusted to clamping position. After the wheel has been laid in place, as above explained, one or more of the hand wheels is revolved, which imparts an equal revolution to the other hand wheels, whereby the lower or movable jaw will be fed up along the three screw posts as guideways until the upper rim of the positioned pulley wheel is brought into contact with the jaw teeth on the under face of the fixed jaw head. The upper teeth, being in exact register with the lower teeth, cause the pulley wheel to automatically move to an exactly level position and to center itself in the exact center of the chuck. Prior to the final clamping movement, the pin 26 is dropped through one of the holes 25, and the wheel is revolved by hand sufficiently to bring one of its spokes into contact with the pin, after which the final clamping movement is given. The presence of the pin prevents any turning or torsional movement of the wheel by its contact with one of the spokes, and this obviates the necessity for giving such a tight clamping movement as might be otherwise required.

The device is one which is adapted to handle pulley wheels of varying diameter,—sufficient teeth being provided to accommodate all sizes of wheels within a reasonable limit. The idler pulley wheels enable the endless chain to be adjusted to any degree of tightness, and the ball bearings serve to minimize friction in making the adjustment.

What I regard as new and desire to secure by Letters Patent is:

1. In a centering chuck, the combination of a bed plate, a fixed jaw head, fixed screw posts connecting the bed plate with the jaw head, a movable jaw head adjustably guided by the fixed screw posts, a hand wheel screw-threaded onto one of the screw posts, sprocket teeth on said hand wheel, sprocket wheels on the other screw posts, an endless chain meshing with all of the sprocket teeth, for imparting uniform adjustment of the movable jaw head along the several screw posts, and means on the fixed and movable jaws for centering the work, substantially as described.

2. In a centering chuck, the combination of a bed plate, three screw posts entered into the bed plate at points equidistant from one another, a fixed jaw head into which the upper ends of the screw posts are entered, a movable jaw head provided with bores through which the screw posts pass, three hubs screw-threaded onto the threads of the screw posts, the upper ends of the hubs being entered through and revoluble within the bores in the movable jaw, sprocket teeth on the three hubs, a hand wheel on one of the hubs, an endless chain engaging the sprocket teeth, and means on the fixed and movable jaws for centering the work, substantially as described.

3. In a centering chuck, the combination of a fixed jaw head and a movable jaw head, and teeth on the fixed and movable jaw heads, said teeth having sloping flat sides converging towards the center of the chuck, the teeth on the two jaws having their apices in register with one another, and means for adjusting the movable jaw, substantially as described.

4. In a centering chuck, the combination of a fixed jaw head and a movable jaw head, and sloping surfaces on the two jaws, said surfaces being beveled in register with one another and sloping in opposite directions, and means for adjusting the movable jaw head, substantially as described.

5. A centering chuck comprising a fixed jaw head and a movable jaw head, oppositely disposed teeth arranged in radial lines on the two jaw heads and having their apices in alinement with one another and their sides beveled in register with one another and sloping in opposite directions, and means for adjusting the movable jaw head, substantially as described.

ROBERT MILNE.

Witnesses:
SAML. H. RECK,
W. B. BOWIE.